United States Patent
Crowley et al.

(10) Patent No.: US 7,617,220 B2
(45) Date of Patent: Nov. 10, 2009

(54) SHARING ACCESS TO CONTENT ITEMS USING GROUP INFORMATION AND ITEM INFORMATION

(75) Inventors: Matthew William Crowley, Los Altos, CA (US); Robert Yuji Haitani, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 266 days.

(21) Appl. No.: 11/614,912

(22) Filed: Dec. 21, 2006

(65) Prior Publication Data
US 2008/0154903 A1    Jun. 26, 2008

(51) Int. Cl.
*G06F 17/30* (2006.01)
(52) U.S. Cl. .................................................. 707/10
(58) Field of Classification Search .................. 709/218, 709/219, 230; 707/9, 10, 104.1
See application file for complete search history.

(56) References Cited

U.S. PATENT DOCUMENTS

| | | | | |
|---|---|---|---|---|
| 6,078,948 A * | 6/2000 | Podgorny et al. | ........... | 709/204 |
| 6,088,702 A * | 7/2000 | Plantz et al. | ........... | 707/103 R |
| 6,918,113 B2 * | 7/2005 | Patel et al. | ................... | 717/178 |
| 7,043,524 B2 * | 5/2006 | Shah et al. | ................... | 709/203 |
| 2003/0009538 A1 * | 1/2003 | Shah et al. | ................... | 709/219 |

\* cited by examiner

*Primary Examiner*—Diane Mizrahi
(74) *Attorney, Agent, or Firm*—Fenwick & West LLP

(57) ABSTRACT

A user can share media content with others by defining one or more groups, where each group includes members who may access a set of user's content item on the online service or on user's local device. Item information is generated for content items to be shared and indicates where the content item can be accessed. The item information is provided to the members of the group that was selected to share the content item. The user can conveniently configure or update the group to share the user's content items. The content items to be shared can be located on an online service or on the user's local device.

15 Claims, 8 Drawing Sheets

FIG. 3

Group Information (334)

| Group ID | Members | Shared Items Info Header |
|---|---|---|
| Group 1 | Member 1 Info; Member 3 Info; Member 4 Info... | Item 1; Item 2 |
| Group 2 | Member 2 Info; Member 4 Info; Member 5 Info... | Item 1; Item 3 |
| Group 3 | Member 2 Info | Item 2 |
| ... | | ... |

Shared Item Information (550)

| | Header | | | | Body |
|---|---|---|---|---|---|
| Item Info ID | File Type | Item Owner | Item Source | Cached | Binary Data |
| 1 | Image | Member 5 | Web Album (http://xxxx) | Yes | Data 1 |
| 2 | Video | Member 2 | Myspace(http://yyyy) | No | None |
| 3 | Text | Member 3 | User's local device | Yes | Data 3 |
| ... | | | ... | | ... |

640 — 642 — 644 — 646 — 648 — 650

SHARING ACCESS TO CONTENT ITEMS USING GROUP INFORMATION AND ITEM INFORMATION

BACKGROUND

The present invention relates generally to content services, and more specifically, to sharing access to personal content items with one or more groups of individuals.

Most online services are inconvenient for collaborative group activities. If a user wants to share a content item accessible from his local device or from his account on an online service, he will generally have to perform multiple steps of accessing the content item, and then send emails to the individuals he would like to share the content item with. Although websites available to the public such as blogs may be used to share the content items with other individuals, most blogs do not classify groups of individuals. Accordingly, the content items on the blogs are available to everyone having access to the blog and it is inconvenient, if not impossible, to restrict or allow certain groups of individuals to access the content items from the blog.

If the content item is located on a user's account on the online service, the problem is exacerbated. The user must log into the online service using his authentication information (e.g., username and password), retrieve the content item, and send the content item to individuals she wants to share the content item with. Sometimes, retrieving the content may take prolonged time, and waste the user's network and hardware resources. Although, the user may inform the authentication information and the location of the content item to the individuals with whom the user wants to share the content item, there are security concerns associated with revealing the authentication information to others.

Therefore, there is a need for a scheme that allows a selected group of individuals to conveniently share content items. There is also a need to eliminate the log in process for the online services for each member of a group when the user is engaged in collaborative activities.

SUMMARY

Embodiments of the invention allow a user to share access to the user's content items with members of a group definable by the user. The shared content items may include content items available from online services or content items stored locally on the user's local device. In one embodiment, group information and item information is used to share the content items. The group information is defined by a user to specify one or more groups with one or more members. The members of each group may access different selections of the user's content item. The item information indicates where the content item can be accessed and is available to the members of the group selected for sharing the content items. Using the item information, a member of the group may access the shared content item.

In one embodiment, the group information and the item information are generated on the user's local device. When the user selects one or more groups that can access the content item, the members are identified from the group information. Then, the item information corresponding to the content item is sent to the members of the selected group. The members having the item information may access the content item using the item information.

In one embodiment, the item information may be stored on a remote server. The remote server includes group data storage which stores the item information for each member. The item information for a member stored on the remote server is accessible only by that member. When a user defines a group and selects a content item to be shared with that group on a local device, the item information for that content item is generated and sent to the remote server. Then, the remote server stores the item information and allows it to be accessed only by the members of the selected group. The members of the selected group may retrieve the item information and access the content item corresponding to the item information.

In one embodiment, the remote server stores authentication information for accessing online services. When the member attempts to access a content item stored on an online service that requires the user's authentication (e.g., username and password), the remote server may act as a proxy server that accesses the content item and provides it to the member.

In one embodiment, the remote server collects and caches content items from the online services and the user's local device. The collecting and caching allow the members to access the content items faster. Also, the caching of the content items stored on the user's local device allows members to access the content item even when a network connection to the user's local device is not available.

In one embodiment, a peer to peer communication between the user's local device and the member's local device is used to send the item information.

BRIEF DESCRIPTION OF THE DRAWINGS

Embodiments of the invention can be readily understood by considering the following detailed description in conjunction with the accompanying drawings.

FIG. 3 is a diagram showing a data structure of group information, according to one embodiment of the present invention.

FIG. 6 is a diagram showing a data structure of item information stored on a remote server, according to one embodiment of the present invention.

DETAILED DESCRIPTION OF EMBODIMENTS

Figure 1:
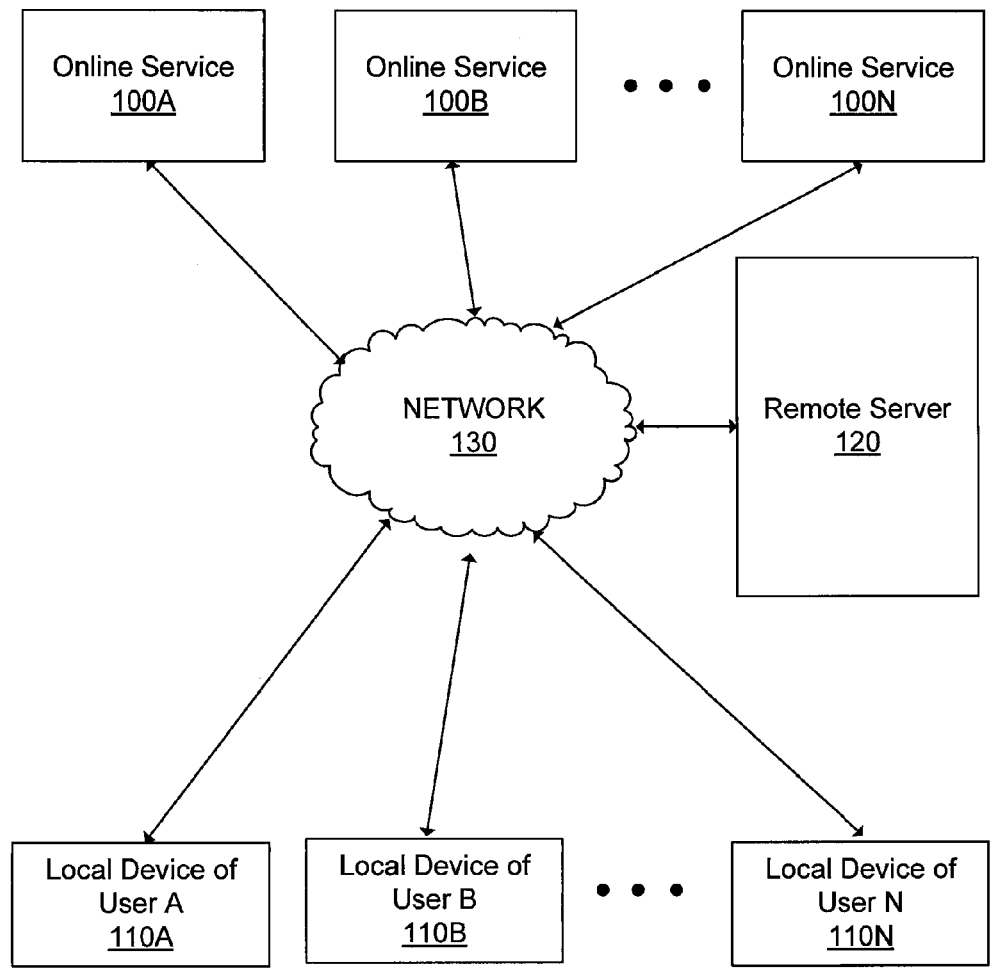
FIG. 1 is a diagram showing a schematic network architecture including a remote server, according to an embodiment of the present invention.

The embodiments of the invention will be described below with reference to the accompanying drawings. Like reference numerals are used for like elements in the accompanying drawings.

Overall Architecture

A user may share particular content items with other individuals by defining group information, which identifies one or more groups that may each contain one or more members in the group. The groups and their members may be defined by the user to facilitate the process of determining which content items should be shared with which individuals. Accordingly, each group is also associated with item information that identifies a set of content items that are to be shared with the members of that group. In one embodiment, the group information is different for each user. In another embodiment, the group information is synchronized among users so that each user belonging to a group has the same group information.

Item information indicates, among others, a source of a content item. The source of the content item can be indicated by, among others, a Uniform Resource Locator (URL) address, an RSS feed, a directory and file name, a memory address, and a redirection address. A member of a group may use the item information to access a content item corresponding to the item information. For example, the item information may include a URL address of an image file on the user's blog which the user wants to share with a group. A member of the group having the item information (i.e., URL address) can access the image file using a web browser. As explained below with reference to FIG. 6, the item information may include other information such as the owner of the content item, and an indication as to whether the content item is cached on a remote server.

The concepts of user and member are introduced herein for the sake of explanation, where the user shares content items with one or more members of groups that may be defined by the user. In various embodiments, the user uses a local device to share a content item with members of a group. Actions for sharing the content item are actively taken by the user, whereas the members passively benefits from the user's selection of the group. A user was selected to facilitate understanding of the invention and is not a fixed entity. Accordingly, when another individual (or entity) takes actions to share his content item with others, the individual (or entity) becomes the user and the others become the members.

The content item may include any types of content items, including both time-based content items and static content items. The time-based content items are content items that appear, update or disappear with progress of time. The time-based content items include, among other contents items, audio, video, automatically updated weather information, news, stock price updates, and auto-advancing presentations and messages. The static content items remain constant with the progress of time. The static content items include, among other content items, still photos and texts. The content items may be available from online services or from the user's local device.

The authentication information may include any information that is employed to authenticate the identity of the user. For online services using a combination of a username and a password for authentication, the authentication information may include the username and the password of the users. When other security schemes such as digital certificates and cookies are employed, the authentication information may also include the digital certificates and the cookies.

FIG. 1 is a diagram illustrating a schematic network architecture including a remote server 120 according to an embodiment of the present invention. Each of the online services 100A through 100N is generally referred to as online services 100. Each of user's local device 110A through 110N is generally referred to as user's local devices 110. The user's local devices 110, the remote server 120, and the online services 100 communicate through a network 130.

The local devices 110 can be various devices capable of accessing the content items. For example, the local devices 110 can be a personal computer, an MP3 player, a mobile phone, a smart phone, a PDA (Personal Digital Assistant), or a video game console.

The online services 100 provide various services to users through the network 130. Such services include, among other services, message boards, chat services, electronic mail between members, RSS feeds, file download services, current news and weather updates, online encyclopedia, airline reservations, online games, photo/video sharing services, music sharing services, and radio broadcasting services. Some online services 100 may require the authentication information and some may not.

The remote server 120 receives, stores and sends the item information as explained below with reference to FIGS. 4 and 5. The remote server 120 may also collect and cache all or selected content items of the item information received from the user's local device 110 to allow the members of the group to access the content items faster. Also, the caching of the content items from the user's local device allows the members to access the content items even when connections to the user's local device are not available.

Local Device Structure

Figure 2:
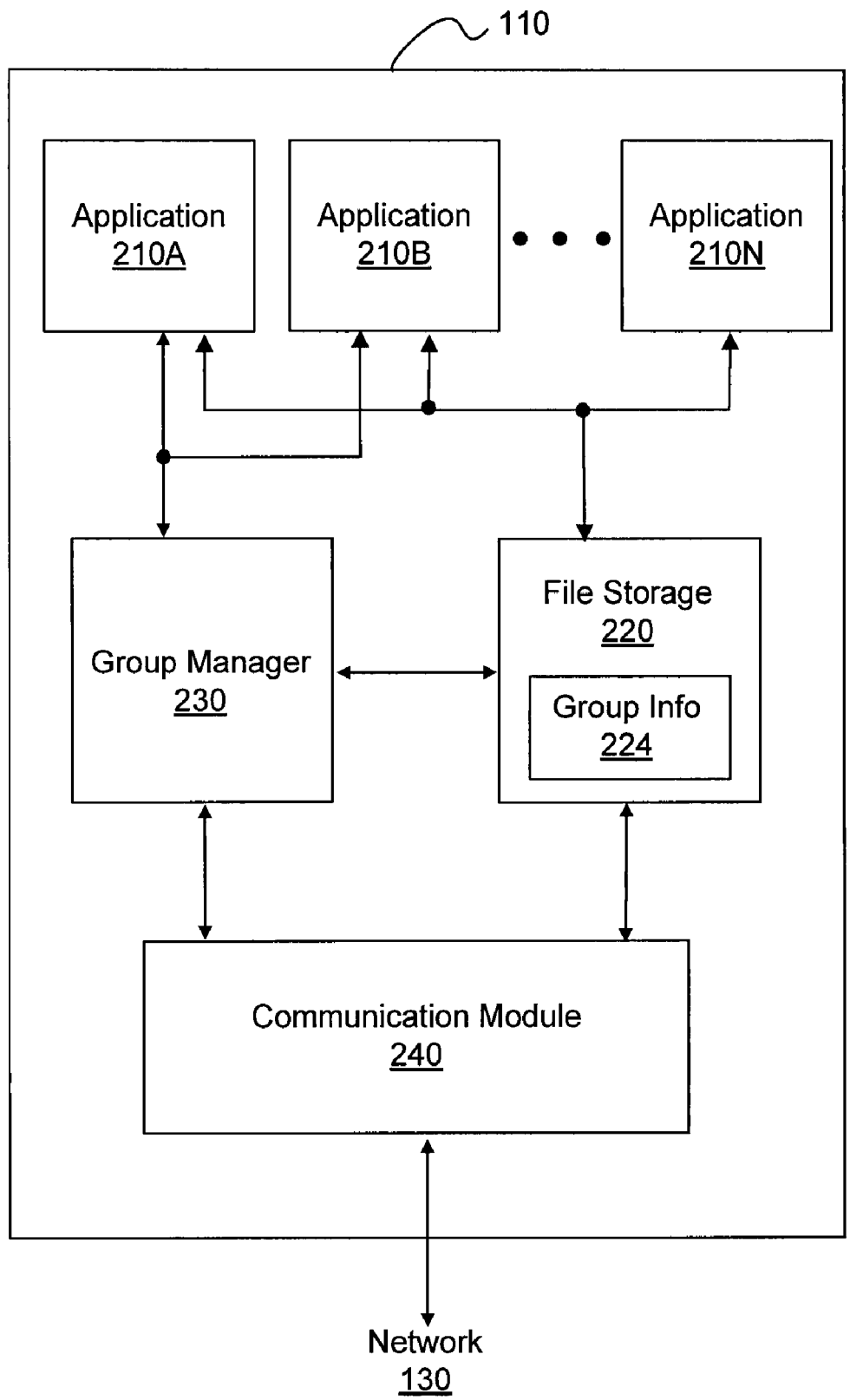
FIG. 2 is a block diagram showing a local device, according to one embodiment of the present invention.

FIG. 2 is a block diagram of a user's local device 110 according to one embodiment of the present invention. The user's local device 110 includes, among other components, applications 210 (each of application 210A through 210N is generally referred to as the applications 210), a group manager 230, a file storage 220, and a communication module 240. The applications 210, the file storage 220, and the communication module 240 are briefly explained to the extent that they are directly related to the present invention. The applications 210 (e.g., photo viewers, media players, and web browsers) allow the user to access various content items from the online services 100 or from the file storage 220. The file storage 220 stores various files or data, including the group information 224 for the user of the local device 110. The file storage 220 can be implemented by various storage devices including, a flash memory device, a hard disk, a floppy disk, and RAM (Random Access Memory). The communication module 240 communicates with the services 100, and the remote server 120 through the network 130.

The group manager 230 generates, updates, and organizes the group information 224 and the item information of shared content items. In one embodiment, the group manager 230 operates in conjunction with the applications 210 to generate or update the group information and the item information. In one embodiment, the group manager 230 sends the group information to the remote server 120 through the communication module 240 for storing as explained below with reference to FIGS. 4 and 5. When a content item is configured to be shared by a group, the group manager 230 sends to the remote server 120 group IDs indicating groups that should share the content item. Then, the remote server 120 determines the members of the group based on the group information previously stored on its group data storage 430 and sends the item information (corresponding to the configured content item) to the members of the group.

In another embodiment, the group manager 230 does not send the group IDs to the remote server 120. Once the content item is configured for sharing by a group, the group manager 230 identifies the members of the group to which the item information (corresponding to the configured content item)

should be sent. Then the group manager 230 requests the remote server 120 to send the item information to the members of the group identified by the group manager 230.

In one embodiment, the group manager 230 synchronizes part or all of the group information 224 with the group information 224 stored on members' local devices 110. In this embodiment, the group manager 230 of a local device 110 communicate with the group manager 230 of other devices 110 to share the group information and the shared item information for a group. Using the shared group information and the shared item information, the user and the members of the group can manage a common group. For example, multiple family members can take pictures of a family event with different local devices. A group for the family member can be established, and its group information can be synchronized among the local devices 110 of the family members. Using the group information and shared information, each family member can share photos from the family event with other family members.

In one embodiment, a default group can be set for any contents items generated or modified by an application or applications 210. The user may configure the application(s) so that the group manager 230 of the user's local device 110 generates shared item information for any content items that are generated or modified by the application. For example, whenever the user takes photos using a camera installed on the user's local device 110 or edits images using a photo edit application installed on the user's local device 110, the group manager 230 automatically generates or updates the shared item information for those photos or images. Then the shared item information are sent out automatically to the members of the default group.

Each of these functional components in the local device can be implemented separately or can be implemented together. For example, the group manager 230 and the applications 210 may be implemented as one module. Moreover, each component, whether alone or in combination with other components, can be implemented for example, in software, hardware, firmware or any other combination thereof.

Group Information Structure

FIG. 3 is a diagram showing a data structure of group information 334 according to one embodiment of the present invention. The group information 334 includes, among other fields, a group ID field 342, a members field 344, and a shared items information header field 346. The group ID field 342 identifies one or more groups established by the user. The members field 344 includes information on one or more members of the group. The member information may include identification of the member, for example, usernames for using the remote server 120, email addresses, or unique alphanumeric sequences. The shared items information header field 346 identifies the content items that are shared by the group. Specifically, the shared items information header field 346 is the header portion of the item information explained below with reference to FIG. 6.

Remote Server Structure

Figure 4:
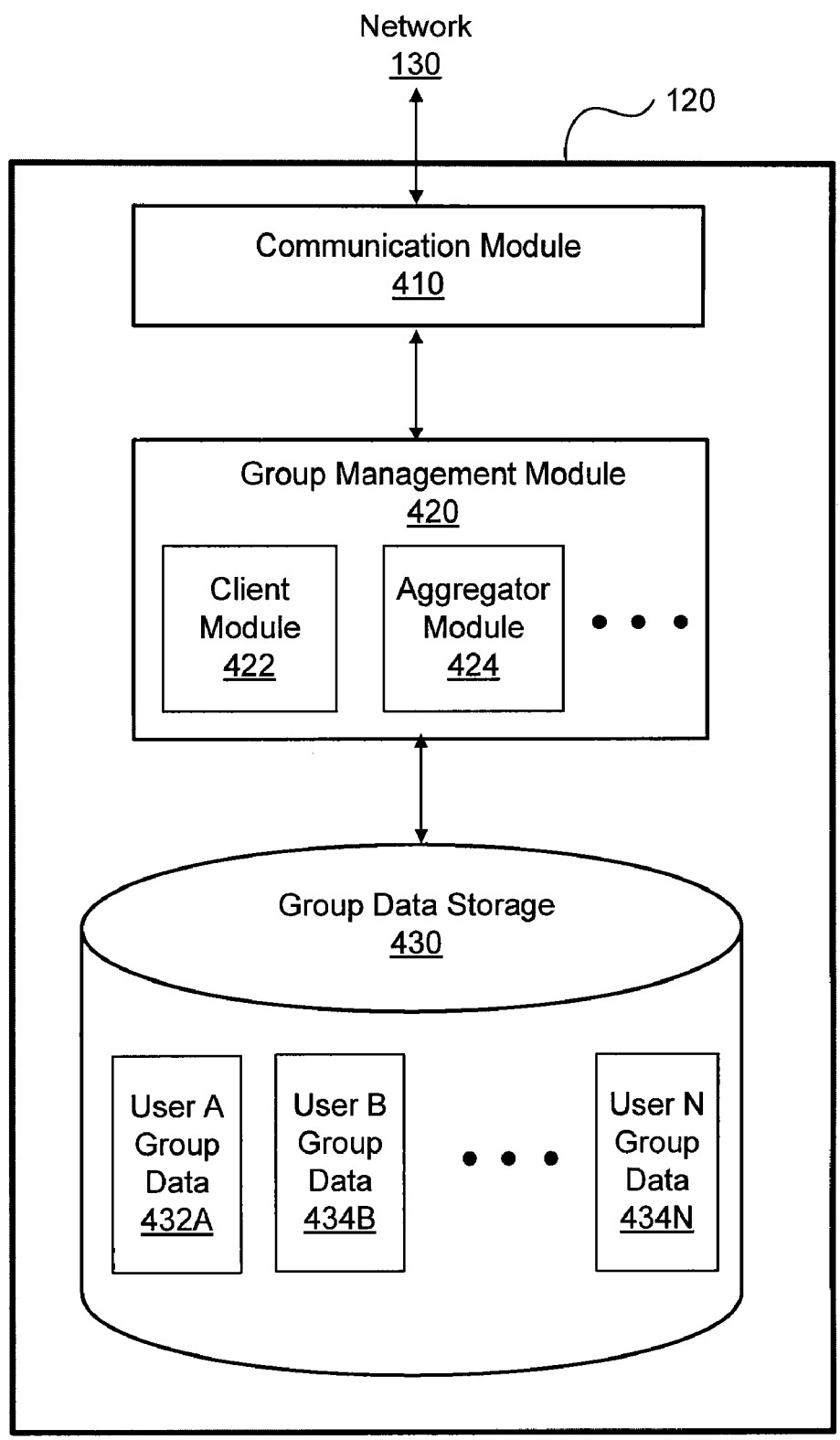
FIG. 4 is a block diagram showing a remote server, according to one embodiment of the present invention.
Figure 5:
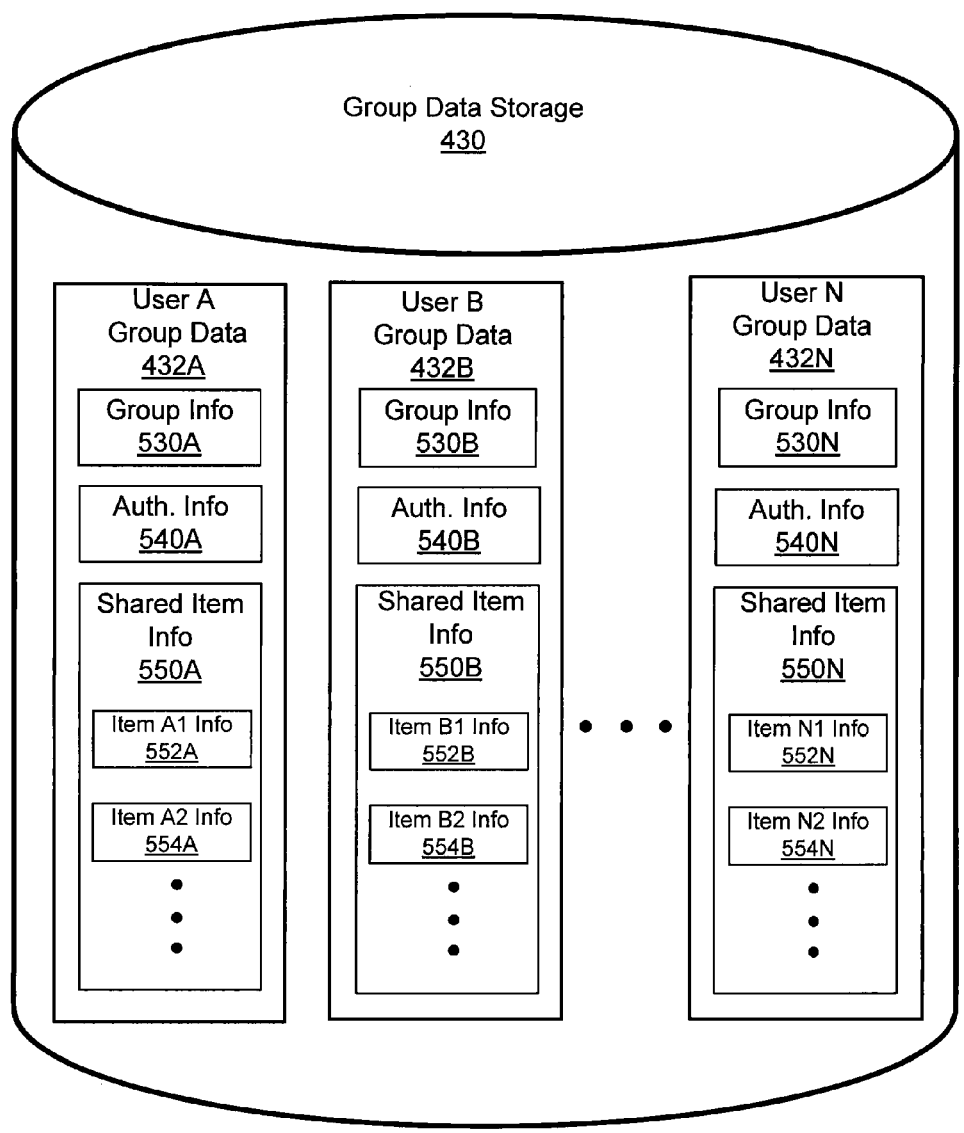
FIG. 5 is a diagram showing a data structure of group data, according to one embodiment of the present invention.

FIG. 4 is a block diagram of the remote server 120 according to one embodiment of the present invention. The remote server 120 includes, among other components, a communication module 410, a group management module 420, and group data storage 430. The communication module 410 communicates with the local devices 110, and the online services 100 through the network 130. The remote server 120 may also include a module (not shown) for converting file formats. The converting module may convert content items not compatible to the member's local devices 110 to compatible formats before sending the content items to the member's local devices 110.

The group management module 420 includes, among other components, a client module 422, and an aggregator module 424. In one embodiment, the client module 422 controls the access of the member's local device 110 to the group data storage 430. The aggregator module 424 automatically aggregates the content items from the online services 100 and/or the user's local device 110, and stores the content items in the group data storage 430. To access the online services 100 that require user authentication, the aggregator module 424 may use the authentication information of the user stored in the group data storage 430.

All or some of the content items may be cached on the remote server 120. The caching allows a faster access to the content item because the member's local devices 110 do not need to access the online services 100 or the user's local device 110 individually to collect the shared content items using the item information. In one embodiment, all of the content items on the user's local device 110 that the user wants to share are cached on the remote server 120. The client module 422 and the aggregator module 424 can be implemented separately or can be implemented together as a single module.

The group data storage 430 stores, among other data, the user group data for each user. The group information, authentication information, and shared item information are classified into each user and stored for retrieval by the local devices 110. In one embodiment, the group data storage 430 comprises a user group data 432A through 432N (collectively called the user group data 432). Each group data 432 includes group information 530, authentication information 540, and shared item information 550. The group information 530 stores information on one or more groups and their members. The group information 530 may be generated by the user's local device 110. The authentication information 530 is the user's authentication information for online services that require user authentication to access the content item stored on the online services. The authentication information 530 can be stored by the user on the remote server 120 before the members access the content item (e.g., during account setup at the remote server 120, or during the sharing configuration of the content item).

The shared item information 550 includes item information (e.g., 552 and 554) for all of the content items that are shared with other members. As explained below with reference to FIG. 6, the item information indicates where and how the content item corresponding to the item information can be accessed. The item information originating from a user's group data (e.g., 432A) is mapped with the corresponding item information stored on member's (i.e., other user's) group data (e.g., 432B through 432N). Accordingly, when the user deletes or updates the item information for a content item, the item information stored on member's (i.e., other user's) group data changes correspondingly.

Each functional component in the remote server 120 can be implemented separately or can be implemented together. For example, the group management module 420, and the communication module 410 may be implemented as one module. Moreover, each component, whether alone or in combination with other components, can be implemented for example, in software, hardware, firmware or any other combination thereof.

FIG. 6 is a diagram showing a data structure of the item information 550 stored on the remote server 120 according to one embodiment of the present invention. The item information for each content item includes a header and an optional body. The header of the item information includes, among others, an item information ID field 640, a file type field 642, an item owner field 644, an item source field 646, and a cache indication field 646. The item information ID (e.g., 1, 2, 3) is a unique identification distinguishing the item information of a content item from the item information of another content item. The file type field 642 indicates the file type of the content item associated with the item information. The item owner field 644 indicates the originating owner of the content item. Most importantly, the item source field 646 of the item information includes information necessary for accessing the content item (e.g., a URL address, a directory and file name, a memory address, and a redirection address). In one embodiment, authentication information of the item owner is stored in the item source field 646. In another embodiment, the authentication information of the item owner is not stored in the item source field 646. In this embodiment, the authentication information can be accessed from the authentication information 530 separately stored on the group data storage 430. The cache indication field 648 indicates whether the content item is cached on the group data storage 430. If the content item is cached, the body 650 of the item information field includes binary data of the content item. As will be recognized by a person skilled in the art, the file structure of FIG. 6 is merely exemplary, and various other data structures for the file storage 550 can be used.

Method of Sharing Access to Content Items

Figure 7:
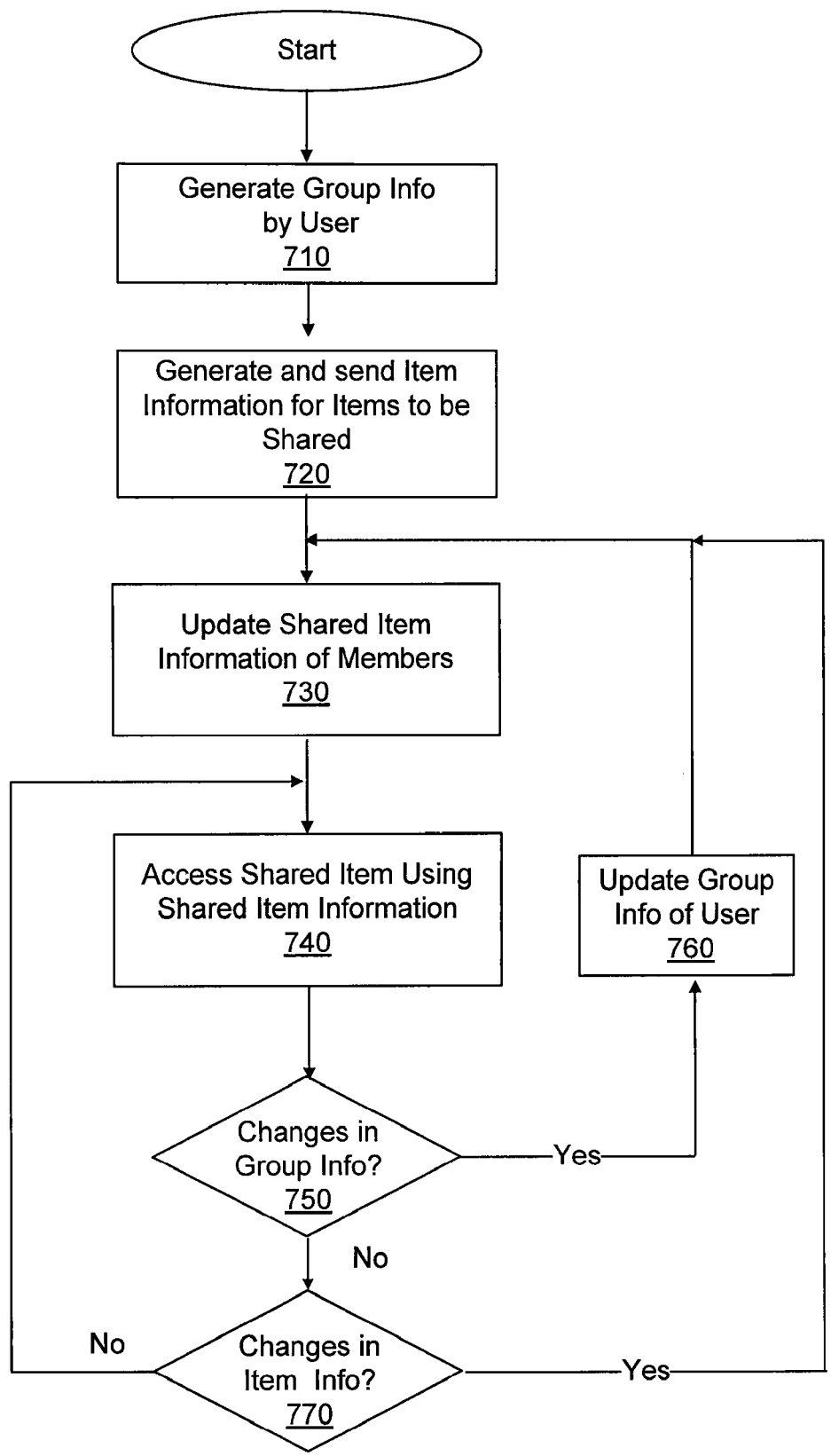
FIG. 7 is a flow chart showing a method for sharing a content item of a user, according to one embodiment of the present invention.

FIG. 7 is a flow chart showing a method for sharing a content item according to one embodiment of the present invention. First, the group information for a group is generated 710. In this step, the user configures each group and designates members to each group (e.g., Friend group configured to include Bob and Jim, and Family group configured to include Dad and Mom). In one embodiment, the members are identified by usernames or email addresses for accessing the remote server 120.

Then, the item information for items to be shared is generated and sent 720 to the remote server 120. In this step, the user indicates which content items are to be shared with which group. Once the content items are configured for sharing, the group manager 230 (shown in FIG. 2) generates item information corresponding to the content items to be shared. An example of configuring a content item for sharing is explained with reference to FIG. 10.

Once the item information is received by the remote server 120, the remote server 120 updates 730 the shared item information 550 of the user's and members' group data 432. If subsequent changes to the item information are received from the user, the remote server 120 also updates 730 the shared item information 550. In one embodiment, the item information of the shared content items is sent to the members of the selected group in this step.

After the shared item information is updated, the members can access 740 the shared content item using the item information. The step 740 of accessing the content item is explained below in detail with reference to FIG. 8.

In the next step, it is determined 750 whether any changes were made in the group information. The determination can be prompted by the user's accessing the group information on his local device 110. If the group information were changed by the user, the group information of the user is updated 760. In this step, the group information on the user's local device 110, and the group information on the remote server 120 are updated. If the group information of the user is updated, the process returns to the step of updating 730 shared item information. In this step, actions are taken by the remote server 120 to make changes in the group data storage 430 to reflect the changes in the group information. For example, when the user disassociates a member from a group, the group information is updated to delete the disassociated member. The item information for shared content items is thereafter deleted from the disassociated member's group data 432. Therefore, the item information is no longer available to the disassociated member, and the disassociated member can no longer access the content items that were shared by the group. In one embodiment, the remote server 120 sends instructions to the disassociated members' local device 110 to delete from the member's local device 110 any item information previously sent by the remote server 120 for being a member of that group.

If no changes are made to the group information, the next step involves determining 770 whether any changes were made to the item information. If the changes were made, the process returns to the step of updating 730 the shared item information. For example, if a content item shared by the user is moved from one online serve to another, the user local device 110 notifies the change to the remote server 120. The remote server 120 then updates all the item information in the group data storage 430 that is associated with the content item. If no change is made to the item information, the process returns to the step of accessing 740 the shared content item.

Figure 8:
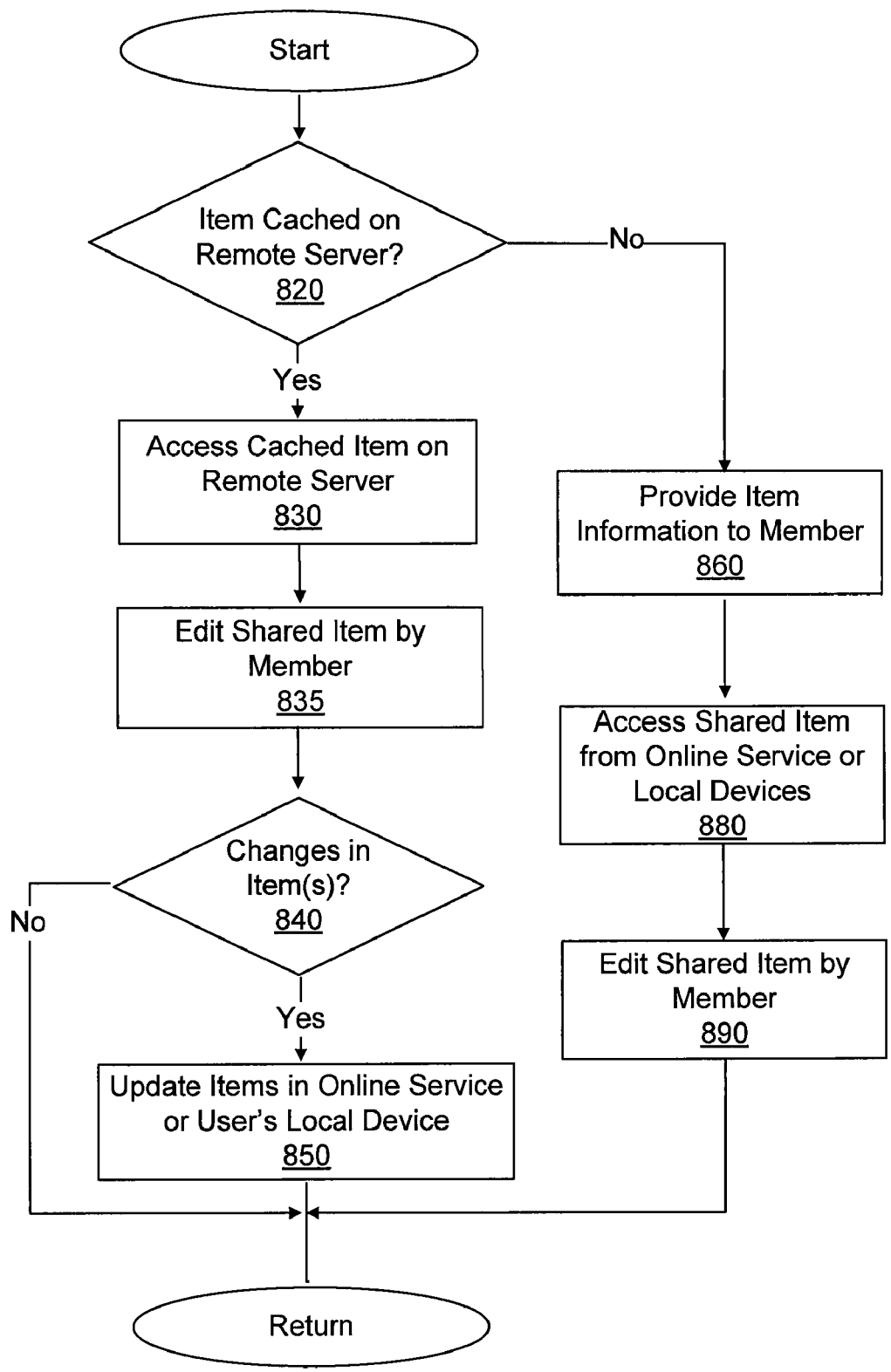
FIG. 8 is a flow chart showing the step of accessing a shared content item, according to one embodiment of the present invention.

FIG. 8 is a flow chart showing in detail the step of accessing 740 the shared content item using the item information. First, when access to the content item is requested by the member of the group, the remote server 120 determines 820 whether the content item is cached on the remote server 120. The determination can be made by reading the cache indication field 646 of the item information (shown in FIG. 6) corresponding to the content item. If the content item is cached on the remote server 120, the remote server 120 sends the item information (including the body field 650) to the member through the network 130. This allows the members to access 830 the cached content item. If the user has allowed editing of the shared content item, the member may edit 835 the cached content item. When it is determined 840 that the cached content item were changed 840 by the member (e.g., editing of the content media by the member), the item information stored on the remote server 120 is updated, and corresponding updates 850 are requested in the content item stored on online services or the user's local device 110. This ends the step of accessing shared item using the shared item information 740.

If the content item is not cached on the remote server 120, the item information corresponding to the content item to be accessed is provided 860 to the user's local device 110. The member may then use the item information to access 880 the content item from the online services or user's local device 110. When the online service requires the user's authentication information, the remote server 120 may serve as a proxy server and provide the item information with its item source field modified to indicate a temporary proxy address that allows the member to access the content item. In one embodiment, all of the content items stored on an online service that requires the user authentication are cached on the remote server 120. When the member attempts to access the shared content item stored locally on the user's local device 110, the member may access the user's local device 110 using the network 130. In another embodiment, all of the shared content items of the user's local device 110 is cached on the remote server 120 (i.e., in the shared item information 550) so that the content items are available to the members even when a network connection to the user local device 110 is unavailable. The user may assign an access level to the group so that only members of certain groups are granted permission to modify the content items on the user's local device 110. If the user has allowed editing of the shared content item, the member may edit 890 the shared content item. This ends the step of accessing shared item using the shared item information 740.

User Interface for Sharing Content Items

Figure 9:
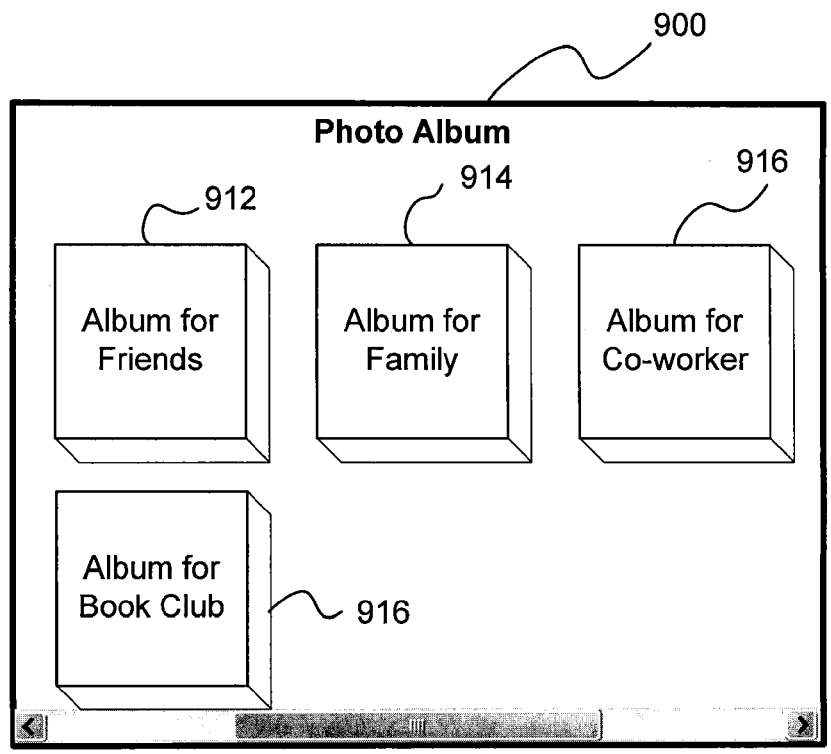
FIG. 9 shows a screen of a user's local device, according to one embodiment of the present invention.

FIG. 9 shows a screen 900 of a user's local device 110 according to one embodiment of the present invention. The user's local device 110 in this example is a smart phone. The screen 900 shows photo album application running on the smart phone. The user in this example already established four groups: Friends, Family, Co-worker, and Book club. The albums 912 to 916 each contain photo(s) to be shared by each of the four groups.

Figure 10:
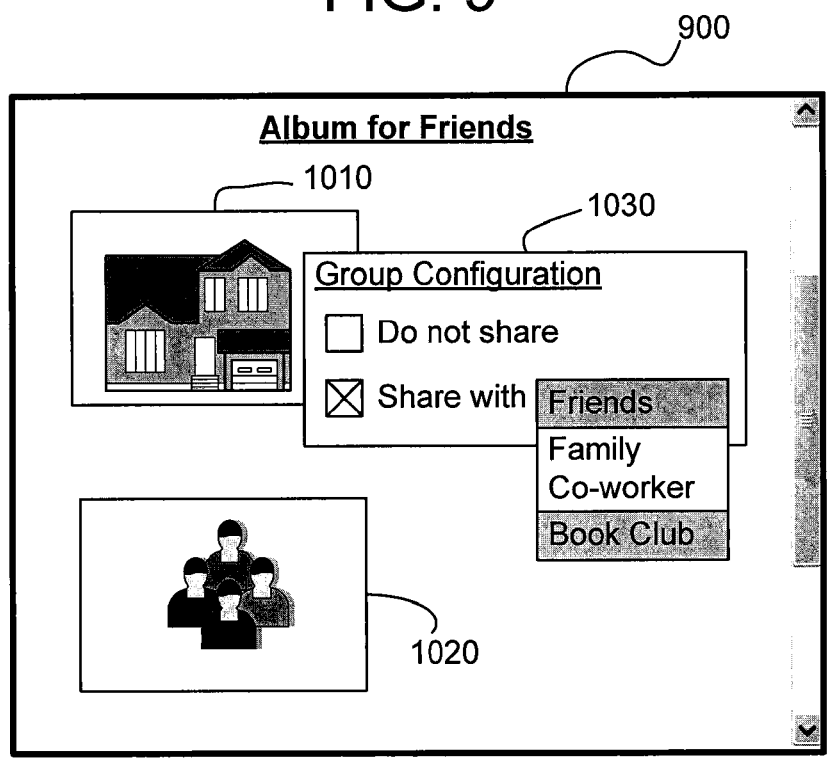
FIG. 10 shows a photo being configured for sharing by groups, according to an embodiment of the present invention.

FIG. 10 shows the screen of the smart phone when the album for friends 912 is clicked. The album for friends 912 contains photo 1010 and photo 1020. In this example, a group configuration window 1030 for photo 1010 is opened. The group configuration window 1030 currently shows that photo 1010 is shared with members of two groups: Friends and Book club. Because photo 1010 is shared with book club as well, photo 1010 will also show up in the album for book club 916. The user can conveniently change the groups to share photo 1010 by selecting or deselecting group(s) from the group configuration window 1030. Then the group manager 230 (shown in FIG. 2) of the user's local device 110 automatically generates or updates the group information and/or the item information corresponding to photo 1010.

Alternative Embodiments

In one embodiment, peer-to-peer synchronization that does not involve a remote server is used for sending the item information for shared content items to the members. The peer-to-peer communication architecture and the network architecture involving the remote server 120 are not mutually exclusive. Both architectures may be used in conjunction or complement one another. For example, the peer-to-peer communication may take place when the network 130 is not available, and then switch to the network 130 based communication involving the remote server once the network 130 becomes available.

In one embodiment, all of the functions performed by the remote server 120 may be performed by the user's local device 110. The user's local device 110 can generate item information, store it, and send it to the member's local devices 110 over the network 130.

As recognized through the example of the local devices and the remote server described herein, the various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a software configured multimedia control mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for configuring sharing of content items, the method comprising:
    generating, by a processor, group information indicating members of one or more user-created groups responsive to receiving a first user input defining the one or more groups, each group including one or more members;
    associating item information of a content item with at least one selected group of the one or more groups responsive to receiving a second user input indicating that the content item is to be shared with members of the at least one selected group, the item information representing a source of the content item from which the content item can be retrieved; and
    sending the item information of the content item to the members of the at least one selected group according to the group information without receiving additional user inputs to allow the members of the selected group to access the content item, responsive to associating the item information with the selected group.

2. The method of claim 1, further comprising:
    sending the group information to a remote server; and
    sending the item information to the remote server, wherein the remote server is configured to enable the members of the at least one selected group to access the content item corresponding to the item information.

3. The method of claim 2, wherein the remote server is configured to obtain the content item associated with the received item information from an online service provided by a server distinct from the remote server using the item information, and further configured to provide the content item to the members of the at least one selected group.

4. The method of claim 2, further comprising:
    updating the group information responsive to receiving a third user input; and
    sending the updated group information to the remote server for storing in the remote server.

5. The method of claim 1, wherein the item information is sent via peer-to-peer communication to the members of the at least one selected.

6. The method of claim 1, wherein the item information includes authentication information associated with an account of the user that provides access to the content items on an online service.

7. The method of claim 1, wherein the group information for a particular group comprises:
    a unique member identifier for each member in the group; and
    a list of shared content items to which the item information associated with the group allows access by members of the group.

8. The method of claim 1, further comprising editing the content item by the members of the group.

9. A computer program product comprising a computer readable medium structured to store instructions executable by a processor, the instructions, when executed cause the processor to:
    generate group information indicating members of one or more user-created groups responsive to receiving a first user input defining the one or more groups, each group including one or more members;
    one or more groups, each group including one or more members;
    associate item information of a content item with at least one selected group of the one or more groups responsive to receiving a second user input indicating that the content item is to be shared with members of the at least one selected group, the item information representing a source of the content item from which the content item can be retrieved; and
    send the item information of the content item to the members of the at least one selected group according to the group information without receiving additional user inputs to allow the members of the at least one selected group to access the content item, responsive to associating the item information with the at least one selected group.

10. The computer program product of claim 9, further comprising instructions to:
    send the group information to a remote server; and
    send the item information to the remote server, wherein the remote server is configured to enable the members of the at least one selected group-to access the content item corresponding to the item information.

11. The computer program product of claim 9, wherein the instructions further causes the processor to:
    update the group information responsive to receiving a third user input; and
    send the updated group information to the remote server for storing in the remote server.

12. The computer program product of claim 9, wherein the instructions, causing the processor to send the item information causes the processor to send the item information sent via peer-to-peer communication to the members of the at least one selected group.

13. The computer program product of claim 9, wherein the item information includes authentication information associated with an account of the user that provides access to the content items on an online service.

14. The computer program product of claim 9, wherein the group information comprises:
   a unique member identifier for each member in the group; and
   a list of shared content items to which the item information associated with the group allows access by members of the group.

15. A computing device comprising:
   a processor for performing instructions;
   a memory associated with the processor for storing the computer program product of claim 9; and
   a communication module associated with the memory and the processor for communicating with another computing device.

* * * * *